United States Patent
Yazaki et al.

[11] Patent Number: 6,025,895
[45] Date of Patent: Feb. 15, 2000

[54] LIQUID CRYSTAL DISPLAY WITH MUTUALLY ORIENTED AND DISPERSED BIREFRINGENT POLYMER AND LIQUID CRYSTAL AND RANDOM ORIENTED TWIST ALIGNMENT

[75] Inventors: Masayuki Yazaki; Hidekazu Kobayashi; Shuhei Yamada; Hidehito Iisaka; Yutaka Tsuchiya; Eiji Chino, all of Suwa, Japan

[73] Assignee: Seiko Epson Corporation, Tokyo, Japan

[21] Appl. No.: 08/687,342

[22] PCT Filed: Dec. 1, 1995

[86] PCT No.: PCT/JP95/02461

§ 371 Date: Aug. 1, 1996

§ 102(e) Date: Aug. 1, 1996

[87] PCT Pub. No.: WO96/17272

PCT Pub. Date: Jun. 6, 1996

[30] Foreign Application Priority Data

Dec. 1, 1994 [JP] Japan .................................... 6-298439

[51] Int. Cl.[7] ........................ G02F 1/1333; G02F 1/1337
[52] U.S. Cl. ........................... 349/86; 349/132; 349/129; 349/179; 428/1
[58] Field of Search ............................... 349/10, 86, 132, 349/129, 179; 428/1

[56] References Cited

U.S. PATENT DOCUMENTS

| | | |
|---|---|---|
| 5,237,641 | 8/1993 | Jacobson et al. . |
| 5,295,048 | 3/1994 | Park et al. . |
| 5,305,126 | 4/1994 | Kobayashi et al. . |
| 5,394,255 | 2/1995 | Yokota et al. . |
| 5,427,828 | 6/1995 | Park .......................................... 349/86 |
| 5,583,675 | 12/1996 | Yamada et al. ............................ 349/86 |
| 5,594,830 | 1/1997 | Winston et al. . |
| 5,600,455 | 2/1997 | Ishikawa et al. . |
| 5,600,462 | 2/1997 | Suzuki et al. . |
| 5,612,803 | 3/1997 | Yamada et al. .......................... 349/156 |

FOREIGN PATENT DOCUMENTS

| | | |
|---|---|---|
| 0 497 619 A2 | 1/1992 | European Pat. Off. . |
| 0 488 116 | 6/1992 | European Pat. Off. . |
| 0 626 607 A2 | 5/1994 | European Pat. Off. . |
| 58-501631 | 9/1983 | Japan . |
| A-62-283315 | 12/1987 | Japan . |
| 4227684 | 8/1992 | Japan . |
| A-4-227684 | 8/1992 | Japan . |
| A-5-100213 | 4/1993 | Japan . |
| 5119302 | 5/1993 | Japan . |
| A-5-119302 | 5/1993 | Japan . |

OTHER PUBLICATIONS

PCT International Preliminary Examination Report for Appln. No. PCT/US97/02226.

*Primary Examiner*—William L. Sikes
*Assistant Examiner*—Kenneth Parker
*Attorney, Agent, or Firm*—Oliff & Berridge, PLC

[57] ABSTRACT

On the substrate (108) are made reflecting type picture element electrodes (107), of Cr, and on substrate 101 are made transference picture element electrodes (102), of ITO. On both substrates (108, 101) parallel alignment films (106, 103), consisting of polyimide alignment films, are each made, but rubbing treatment is not administered. Between the substrates (108. 101) polymer dispersion liquid crystal, in which liquid crystal (105) and polymer (104) are in a state of mutual orientation dispersion, is placed. Liquid crystal (105) is parallel oriented randomly near the substrate surfaces, and twisted approximately 90° between the substrates (101, 108). Also, the orientation domains from the liquid crystal random orientation are evenly multidomained at the level of approximately 1–3 μm. Because they are randomly oriented in this way, directivity of scatter is improved, and operation voltage is decreased.

12 Claims, 6 Drawing Sheets

LIQUID CRYSTAL DISPLAY WITH MUTUALLY ORIENTED AND DISPERSED BIREFRINGENT POLYMER AND LIQUID CRYSTAL AND RANDOM ORIENTED TWIST ALIGNMENT

FIELD OF THE INVENTION

The present invention relates to a liquid crystal display device and a method for producing the same, and more particularly, to a liquid crystal display device comprising the display component of an information equipment terminal, television or home appliance product, and a method of producing the same.

BACKGROUND OF RELATED ART

In recent years, as information equipment has become more compact and lightweight, display devices to be mounted on such equipment have been sought that consume less power. Liquid crystal display devices, by means of the TN mode, are utilized as reflective displays in small display capacity equipment, while liquid crystal display devices, by means of the FTN mode, are utilized in mid-range display capacity equipment. Furthermore, uses wherein an information input apparatus, such as a tablet or the like, is included on the reflective-type display are also expanding, and brightness and good visibility are required in reflective-type liquid crystal display devices.

However, because TN-format and FTN-format liquid crystal display devices that use conventional polarizing plates have low light utilizing efficiency, the problem arises that these become dark when made reflective, and moreover, an extremely dark display results when an information input apparatus, such as a tablet or the like, is included. In addition, because a reflective plate is placed over the polarizing plate on the back surface of the substrate on the back side, in order to make a reflective model with TN format or FTN format, double images occur in the display, small characters are unclear, and there are problems with visibility.

On the other hand, bright reflective-type displays that do not use polarizing plates have come to be developed recently. For example, a liquid crystal display device that uses a polymer dispersion liquid crystal in which liquid crystal and polymer are mutually dispersed, and that performs control so that the display is transparent when an electric field is applied, and the light is scattered when no electric field is applied has been disclosed (Japanese Laid-Open Patent Publication Sho 58-501631), and liquid crystal display devices that perform control so that the light is scattered when an electric field is applied and the display is transparent or light is absorbed when no electric field is applied have also been disclosed (European Patent Application EPO 488116A2, Japanese Laid-Open Patent Publication Hei 4-227684, Japanese Laid-Open Patent Publication Hei 5-119302).

In particular, in the polymer dispersion-type liquid crystal display device using a polymer dispersion liquid crystal disclosed in European Patent Application EPO 488116A2, in which the liquid crystal and polymer are mutually orientation dispersed, it is possible to also use the electrodes as light reflecting surfaces because no polarizing plate is used, and in this case, visibility, high precision and brightness, which cannot be achieved in TN and FTN modes that require polarizing plates, are obtained, and it is possible to obtain a reflective display with superior display quality.

However, with the conventional art that has been disclosed with regard to polymer dispersion type liquid crystal display devices that use polymer dispersion liquid crystal in which the liquid crystal and polymer are mutually orientation dispersed, although it is possible to resolve the problems of a liquid crystal display device that uses a polarizing plate, it is necessary for the liquid crystal to be twisted by not less than 360° in order to obtain sufficient scattering characteristics and to secure brightness, and as a result, the problem arises that the driving voltage becomes high.

For example, large capacity displays are possible by forming active devices such as TFT (thin film transistor) or MIM (metal-insulator-metal) devices at each pixel and providing electric signal control at each pixel, but because the driving voltage of the polymer dispersion liquid crystal is high, it is difficult to drive the liquid crystal so that the liquid crystal responds adequately from the standpoint of the voltage resistance of active devices, and the problems also arise that the contrast ratio tends to fall and driving drivers are necessary that can withstand high voltages.

In addition, because of the orientation dispersion structure, the problem arises that there is directivity in the scattering. Directivity is when the light scattering efficiency changes based on the direction of the external incident light, for example the brightness changes as the panel is rotated, and the problem then arises that the visibility is easily influenced by the usage environment. To the extent that the twisting of the liquid crystal is small, the directivity is larger. Accordingly, the twisting of the liquid crystal should be made larger in order to resolve this problem, but when this is done, the driving voltage becomes large, and consequently, making the twisting larger is impossible from the standpoint of the driving voltage.

Furthermore, when large quantities of a chiral component are added in order to create a large twisting force, the problem arises that hysteresis is created in the electro-optical properties.

The present invention was made in order to solve these types of problems, and its purpose is to provide a liquid crystal display device, through controlling to a new orientation state a liquid crystal that is mutually orientation-dispersed with a polymer, which can be operated at low voltage, which is bright, which has a high contrast ratio, which has improved scatter directivity, and in which visibility has only a low dependence on the usage environment.

DISCLOSURE OF THE INVENTION

In order to solve the problems explained above, the present invention provides a liquid crystal display device wherein a liquid crystal and polymer with refraction index anisotropy are located in mutual orientation dispersion between two substrates whose surfaces have each undergone orientation treatment and on each of which are formed electrodes, and wherein the liquid crystal is randomly oriented near the substrate surfaces roughly parallel to the substrate surfaces, and is twist oriented between the substrates.

In this way, the liquid crystal is twist oriented between the substrates, but because it is randomly oriented roughly parallel to the substrate surfaces near the substrate surfaces, scatter directivity disappears. Thus, it becomes unnecessary to increase the torsion of the liquid crystal in order to solve the directivity problem, and as a result, it becomes possible to operate it at low voltage. Also, it becomes unnecessary to apply large amounts of chiral component to increase liquid crystal torsion, and as a result, the appearance of hysteresis in the electro-optical properties is curbed.

Substrate surface orientation treatment is preferably done by forming an alignment membrane on the substrate surface.

It is preferable that the substrate surfaces not undergo rubbing treatment; this way the liquid crystal can easily be randomly oriented roughly parallel to the substrate surfaces near the substrate surfaces.

With the liquid crystal display device of the present invention, it is preferable that the liquid crystal be evenly multidomained within a face parallel to the substrate surfaces, so that within each domain the alignment direction of the liquid crystal is aligned, and so that each domain exists in a random direction within a face parallel to the substrate surfaces, and so that within each domain the liquid crystal is twist oriented between the substrates.

In this case, it is preferable that the size of each domain be between 0.4 and 10 μm. If under 0.4 μm, scattering is weak, while when 10 μm is exceeded, each orientation domain becomes identified.

Also, it is preferable that the liquid crystal twist angle be 360° or less. When it is over 360°, the operation voltage becomes too high, and operation cannot be done with the usual nonlinear elements. It is particularly preferable that the liquid crystal twist angle be between 30 and 180°.

Also, it is preferable that the liquid crystal contain a chiral component.

Also, it is preferable that the liquid crystal contain a dichroic dye.

Also, in addition, it is preferable that one of the electrodes be formed of a reflective material, so that the present invention can be suitably applied to the liquid crystal display device of a reflective type.

Also, according to the present invention, a method for manufacturing a liquid crystal display device is provided consisting of a process for forming each of the first and second electrodes on each of the first and second substrates, a process for forming alignment films on the surfaces of each of the first and the second substrates, a process for forming an hollow panel from the first substrate and the second substrate without subjecting the first and second substrate surfaces to rubbing treatment, a process for placing between the first and second substrates in the hollow panel a liquid crystal mixed material of a liquid crystal composite and a polymer or polymer precursor, and a process to subsequently deposit the polymer from the liquid crystal compound and cause the general separation of the liquid crystal and the polymer.

In this way, by forming alignment films on each of the first and second substrate surfaces, forming a hollow panel from the first substrate and the second substrate without subjecting the first and second substrate surfaces to rubbing treatment, and by placing between the first and second substrates in the hollow panel a liquid crystal mixed material for the liquid crystal composite and the polymer or polymer precursor, the liquid crystal mixed material twist orients between the first and second substrates, but near the substrate surfaces it is oriented roughly parallel to the substrate surfaces. Then, after that, by separating the polymer from the liquid crystal mixed material and causing the general separation of the liquid crystal and polymer, the liquid crystal orientation state can be preserved at the orientation state of the liquid crystal mixed material before general separation, and while the liquid crystal twist orients between the first and second substrates, it can still be randomly oriented roughly parallel with the substrate surfaces near the substrate surfaces.

In this case, after placing the liquid crystal mixed material between the first and second substrates in the hollow panel, by applying heat treatment past the temperature at which the liquid crystal mixed material shows isotropy and then quenching it, even multidomains can be formed in appropriate sizes.

Also, in terms of convenience of liquid crystal display device manufacture, it is preferable that an ultraviolet cured monomer be used for the polymer precursor, and that the polymer be separated out and liquid crystal and polymer general separation be accomplished by irradiating the liquid crystal mixed material with ultraviolet rays and polymerizing the monomer.

EMBODIMENTS (Embodiment 1)

Figure 1:
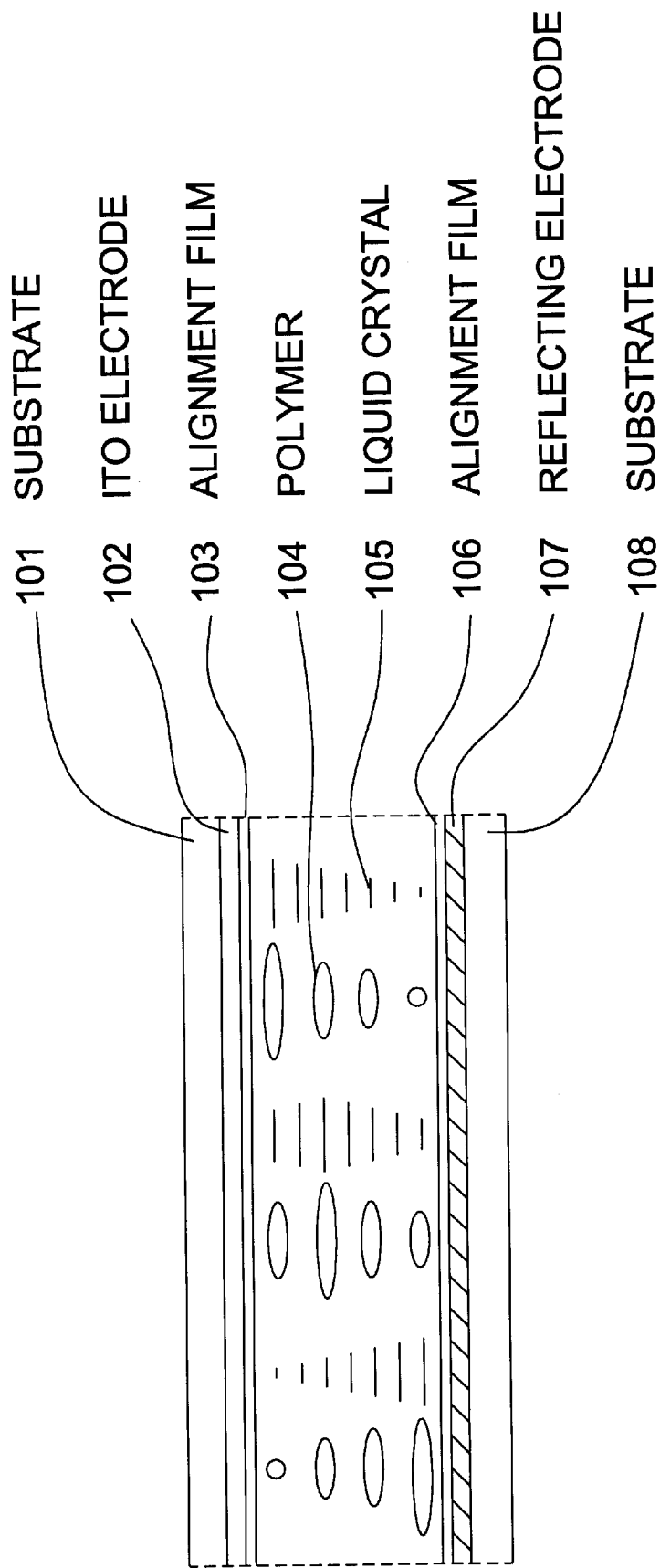
FIG. 1 is a cross section drawing of the liquid crystal display device of the first embodiment of the present invention.

A cross section drawing of the liquid crystal display device of the present embodiment is shown in FIG. 1. On lower substrate 108 is formed reflecting picture element electrode 107, which is patterned, after approximately 2000 angstrom of chrome is formed on it by spattering. On the top side of substrate 101 is formed transference picture element electrode 102, which is patterned, after approximately 1500 angstrom of ITO (Indium Tin Oxide) is formed by spattering. On these two substrates 108 and 101 is applied and baked a polyimide alignment membrane (Optomer AL1254, made by Japan Synthetic Rubber Co.), and each of parallel alignment films 106 and 103 is made. In addition, in order to parallel orient the liquid crystal randomly near the substrate surfaces, rubbing treatment is not performed. Then, by placing the two substrates with a cavity of 5 μm and joining together and fixing the substrate borders, a hollow panel is obtained.

Next, the liquid crystal and polymer precursor mixed material to be enclosed in this hollow panel will be explained. For the liquid crystal, TL-213 (made by Merck) and MJ92786 (made by Merck) are mixed at a 7:3 ratio and used (hereafter referred to as liquid crystal A), and to this are mixed, as a chiral component, R1011 (made by Merck) at 0.15 weight percent and as a dichroic dye, M361, SI-512, and M137 (all made by Mitsui Toatsu Senryo) at, respectively, 1.0 weight percent, 1.5 weight percent, and 0.4 weight percent. The amount of chiral component to be added is fixed at d/p (cell thickness/liquid crystal torsion pitch)= 1/480, or in other words at a 90° twist orientation. Also, as a polymer precursor, biphenyl methacrylate is used at 7 weight percent in relation to the liquid crystal mixture. After the above is heat-mixed and made into a liquid crystal state, it is vacuum enclosed in the previously-explained hollow panel. Then, after the liquid crystal mixed material is heat treated past the temperature at which is shown isotropy, quenching treatment to 25° C. is performed.

The liquid crystal mixed material enclosed in the hollow panel is randomly oriented parallel near the substrate surfaces, and it is inspected with a polarization microscope to see that it is in a state of being twisted approximately 90° between substrates 101 and 108. Also, it is inspected to see that the randomly oriented liquid crystal mixed material orientation domains are even multidomains at the level of about 1–3 µm.

After that, the polymer is separated from within the liquid crystal mixed material by irradiating into the panel ultraviolet rays at an illumination intensity of 5 mW/cm$^2$ (wavelength 350 nm) for seven minutes and polymerizing the polymer, completing the liquid crystal display device of the present embodiment as shown in FIG. 1. Liquid crystal 105 is inspected with a polarization microscope to see that it shows the orientation state from before ultraviolet irradiation, or in other words that it is randomly oriented parallel near the substrate surfaces, that it is twisted approximately 90° between substrates 101 and 108, and that the randomly oriented liquid crystal orientation domains are multidomains at the level of about 1–3 µm. Also, it is confirmed with a polarization microscope that polymer 104 and liquid crystal 105 are in a structure mutually oriented between the substrates and dispersed.

Figure 2:
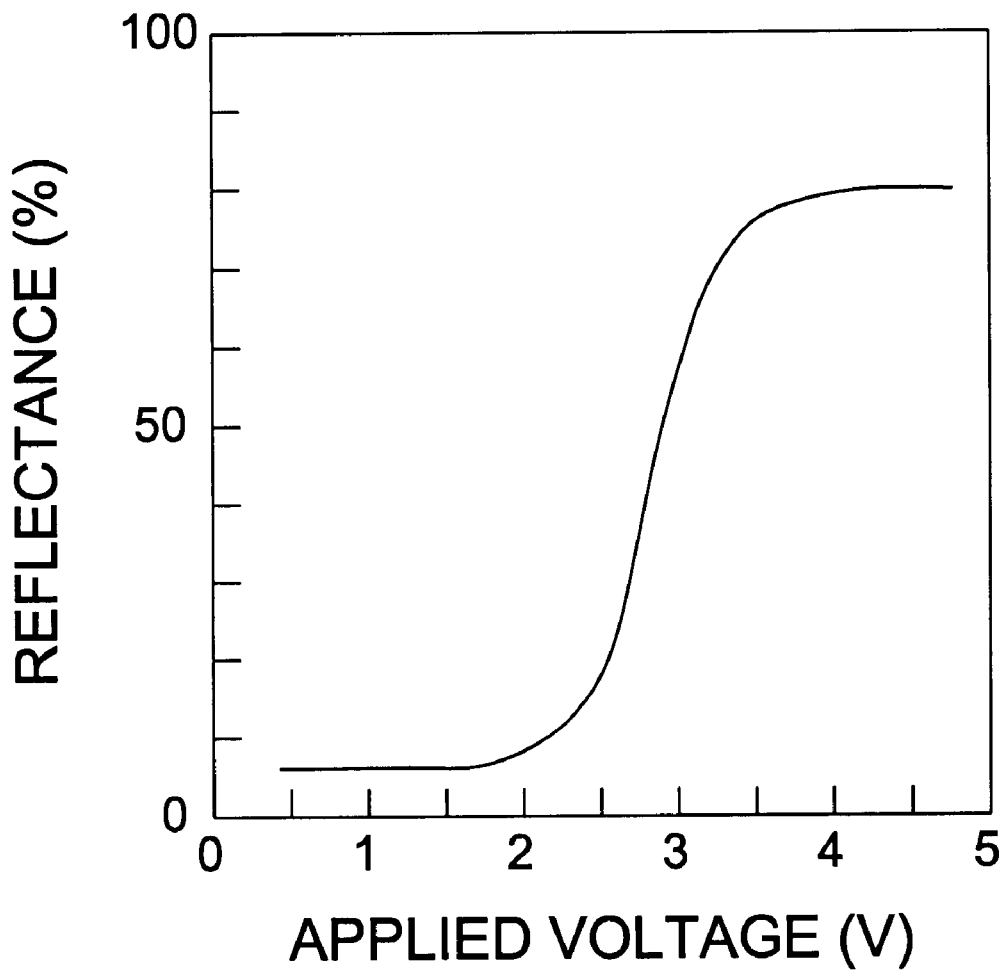
FIG. 2 is a chart showing the electro-optical properties of the liquid crystal display device of the first embodiment of the present invention.

In FIG. 2 are shown the liquid crystal display device electro-optical properties obtained in the present embodiment. The electro-optical properties show a threshold characteristic, and through voltage application, a normally black characteristic of increasing reflectance is obtained. In other words, when the voltage is off, a black display is obtained through the absorption of dichroic dye, and when voltage is sufficiently applied, the liquid crystal is oriented along the electric field direction, so the alignment direction of the polymer and liquid crystal differs and discontinuous points in the refraction index arise in the medium, so it enters a light scattering state. At this time, the dichroic dye is also oriented along the electric field direction, so absorption becomes extremely small, and a white display is obtained.

Figure 3:
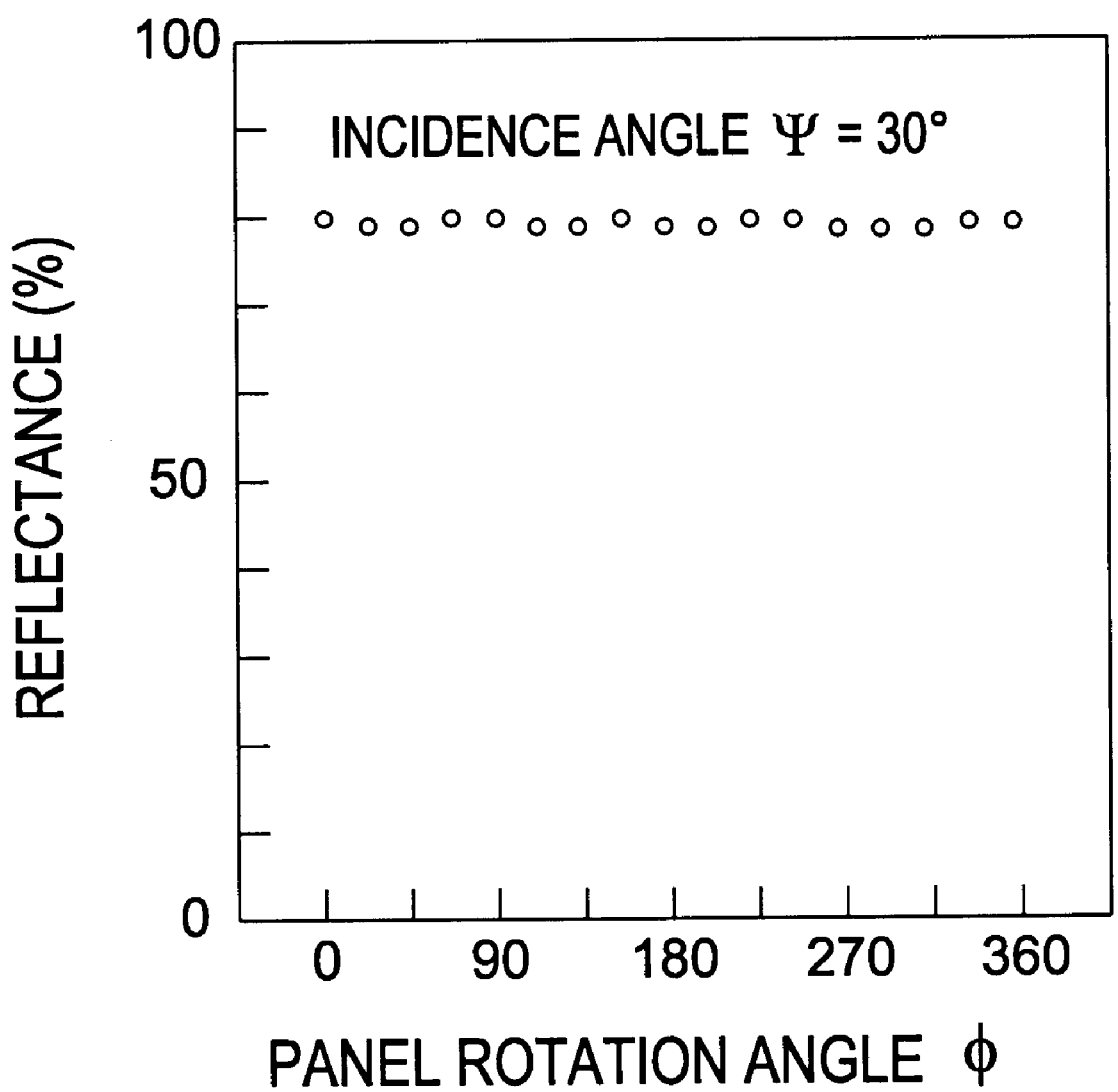
FIG. 3 is a chart showing the scatter directivity of the liquid crystal display device of the first embodiment of the present invention.

Then, the measured results of the electro-optical properties of the liquid crystal display device of the present embodiment are shown. For the electro-optical properties, using a xenon lamp ring as a light source, a 100 Hz rectangular wave was applied on the liquid crystal display device, and light was sent in from a direction 30° (angle of incidence 30°) angled from the display device surface normal line (panel normal line) direction, in all directions (360°), and the reflected light responding to the incident light normal line direction is detected. The area of detection is 2 mm in diameter. Reflectance of 100% is standardized at the luminance of the perfect diffusion plate surface. Below, the threshold voltage value V10 is defined as the voltage when the reflectance is 10 with the (maximum reflectance−minimum reflectance)=100, with the saturation voltage value V90 as the voltage value when the reflectance is 90. Also, for scatter directivity, using parallel beams of light, with incidence angle φ, comprising parallel beams and panel normal line, and panel rotation angle ø as parameters, the change in reflectance of the panel normal line direction was measured. For the liquid crystal display device of the present embodiment, V10 is 1.9V, V90 is 3.4V, and the maximum reflectance is 78%. Also, in FIG. 3 is shown scatter directivity measurement results when incidence angle φ is 30° and voltage 3.8V is applied.

In the present embodiment, the drive voltage is reduced sharply for a polymer dispersed type liquid crystal display device using a polymer dispersed liquid crystal in which liquid crystal and polymer are mutually orientation dispersed. In addition, maximum reflectance, which becomes the index of brightness, is high, for a good level of brightness. Also, in the liquid crystal display device of the present embodiment, as shown in FIG. 3, there is no scatter directivity in relation to panel rotation angle ø. Thus, in an environment with strong light from a certain direction or under an even illumination, brightness changes due to the panel arrangement method are eliminated, and visual angle characteristics, portability, and visibility are improved.

(Embodiment 2)

Figure 4:
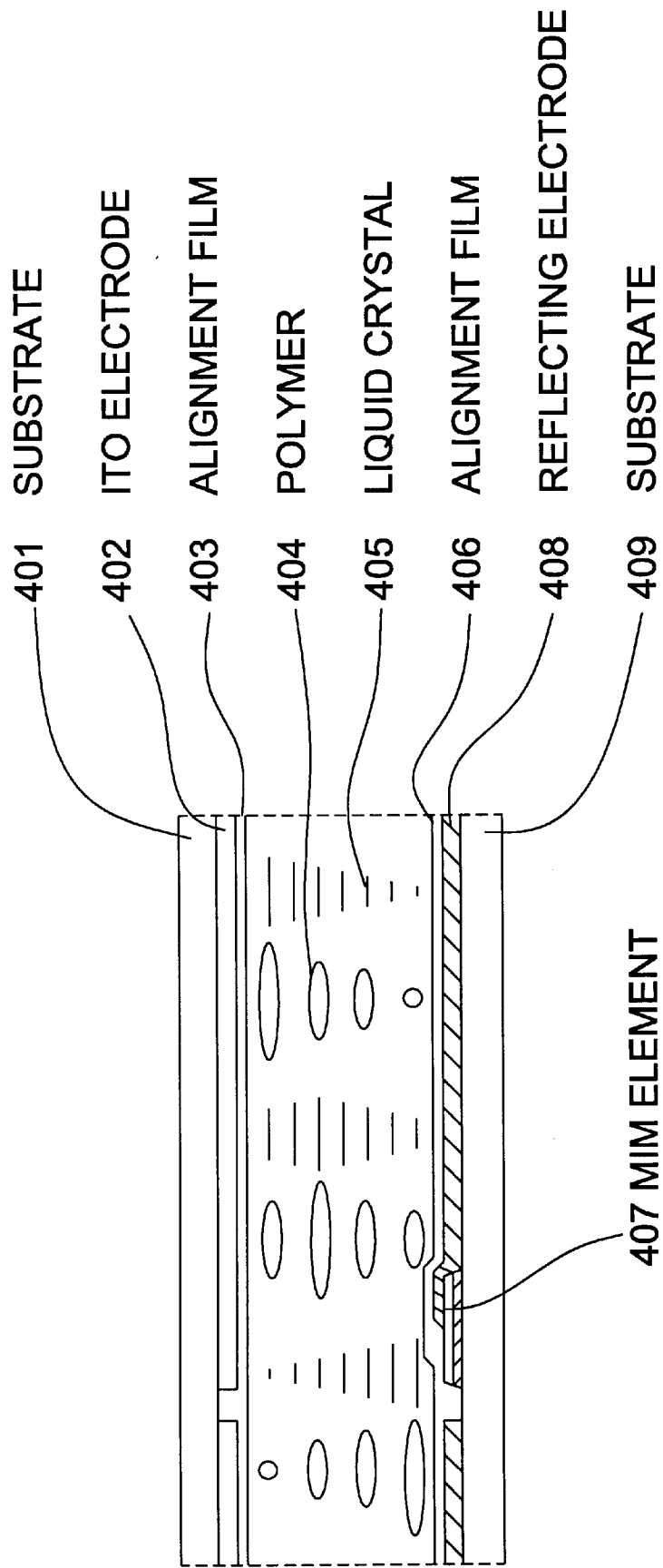
FIG. 4 is a cross section drawing of the liquid crystal display device of the second embodiment of the present invention.

Below will be illustrated the present embodiment, a structure in which two terminal elements (MIM) are formed on each picture element electrode, and in which the liquid crystal is multidomained and is twist oriented between the substrates. In FIG. 4 is shown a cross section drawing of the liquid crystal display device of the present embodiment. The lower substrate 409 is a MIM substrate manufactured through two photoprocesses. In the substrate process, after spattering Ta, it is patterned in the desired shape (first photoprocess), and next the Ta is anodized, and on the Ta surface insulating membrane $Ta_2O_5$ is formed. Then, after spattering Cr, it is patterned in the desired shape (second photoprocess), and MIM element 407, consisting of Ta—$Ta_2O_5$—Cr, and reflecting picture element electrode 408, made up of Cr, are formed. On the other hand, on upper substrate 401, ITO is spattered, and patterned into a stripe shape, and then ITO electrode 402 is formed. Then, both substrates, after spin coating with Japan Synthetic Rubber Co.-made Optomer AL1254, are baked for one hour at 150°, and parallel alignment films 403 and 406 are formed. The two substrates thus obtained are placed together with a cavity of 5 µm and their borders are joined and fixed, making a hollow panel with a five inch diagonal. In addition, in order to parallel orient the liquid crystal randomly near the substrate surfaces, rubbing treatment is not performed.

Then, the liquid crystal mixed material, consisting of the same liquid crystal, dichroic dye, chiral component and polymer precursor as in the first embodiment, is vacuum enclosed in the hollow panels. The liquid crystal mixed material enclosed in the panel, just as in the first embodiment, is inspected with a polarization microscope to see that it is parallel oriented near the substrate surfaces, and in a state of being twisted approximately 90° between substrates 401 and 409, and also it is inspected to see that the randomly oriented liquid crystal orientation domains are even multidomains at the level of approximately 1–3 µm.

After that, the polymer is separated from within the liquid crystal mixed material by irradiating into the panel ultraviolet rays at an illumination intensity of 5 mW/Cm$^2$ (wavelength 350 nm) for 7 minutes, and the liquid crystal display device of the present embodiment shown in FIG. 4 is completed. Liquid crystal 405 is inspected with a polarization microscope to see that it shows the orientation state from before ultraviolet radiation, or in other words that it is randomly oriented parallel near the substrate surfaces, that it is twisted approximately 90° between substrates 401 and 409, and also that the randomly oriented liquid crystal domains are even multidomains at the level of about 1–3 µm. Also, it is confirmed with a polarization microscope that polymer 404 and liquid crystal 405 are in a structure mutually oriented between the substrates and dispersed.

When the liquid crystal display device thus obtained is MIM operated at 1/480 duty, under the measurement conditions of the first embodiment, maximum reflectance is 63%, and contrast is 11. Also, there is no directivity to the scatter when voltage is applied, thus making it possible to obtain a liquid crystal display device with superior portability, vision characteristics, and visibility. In addition, when nonglare treatment and nonreflecting coating are administered to the surface of this liquid crystal display device, background reflection is reduced and visibility is greatly improved. In addition, in the present embodiment, reflecting electrodes are placed on the MIM substrate, but it is also possible to form reflecting electrodes on the facing substrate side.
(Embodiment 3)

Figure 5:
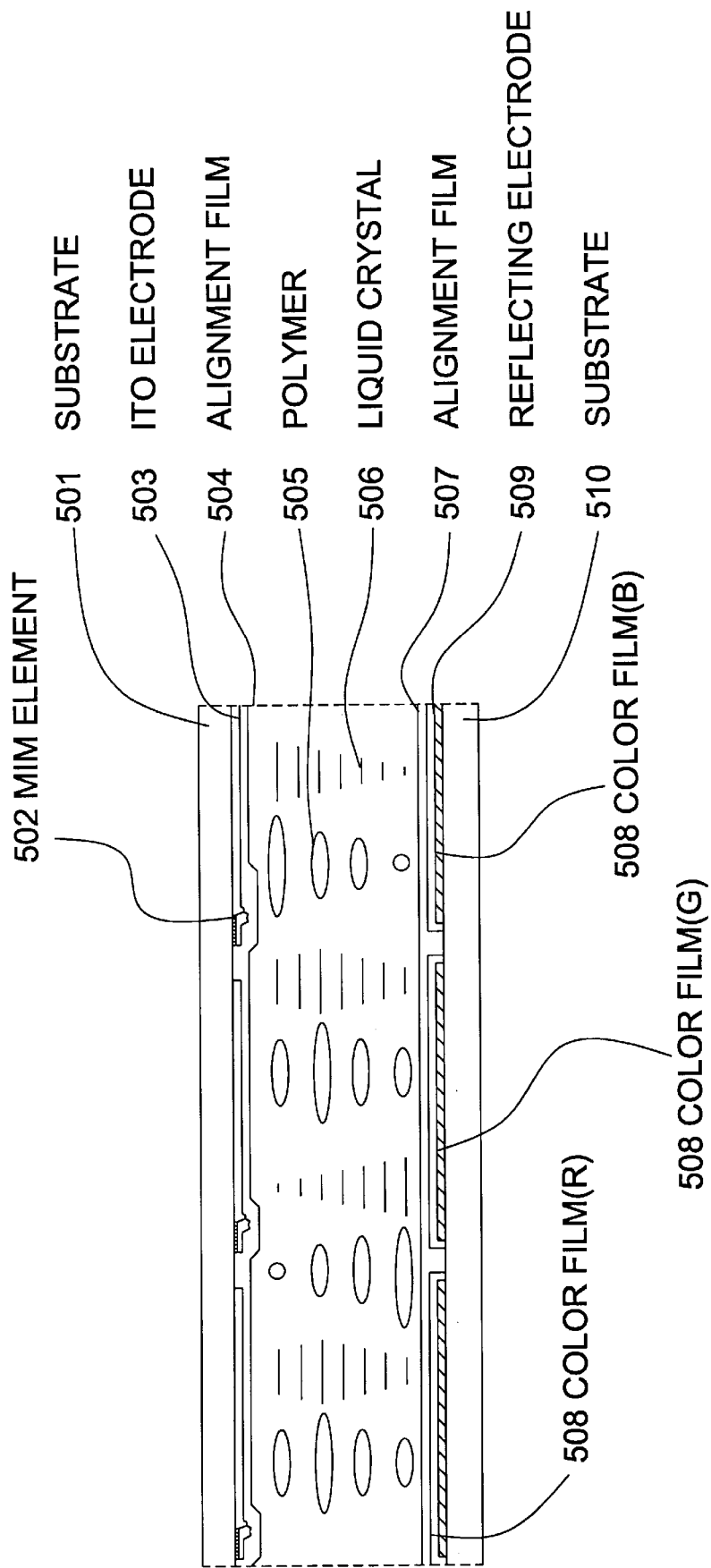
FIG. 5 is a cross section drawing of the liquid crystal display device of the third embodiment of the present invention.

Below will be illustrated the present embodiment, a structure that uses a substrate that has two terminal elements (MIM) formed on each picture element electrode, and on which are formed on the reflecting electrodes a color filter, and in which the liquid crystal is multidomained and also twist oriented between the substrates. In FIG. 5 is shown a cross section drawing of the liquid crystal display device of the present embodiment. Upper substrate 501 is a MIM substrate manufactured through three photoprocesses. After Ta is spattered, it is patterned in the desired shape (first photoprocess), then Ta is anodized, and on the Ta surfaces is formed insulating membrane $Ta_2O_5$. Then, after Cr is spattered, it is patterned into the desired shape (second photoprocess), and a circuit, composed of Cr, and MIM elements 502, comprising Ta—$Ta_2O_5$—Cr, is formed. Then, after ITO is spattered, it is patterned in the desired shape (third photoprocess), and transference picture element electrodes 503, each connected to MIM elements 502, are formed. On the other hand, on bottom substrate 510, after Al-Mg is spattered, it is patterned in a stripe shape and reflecting electrodes 509 are formed. On these reflecting electrodes 509, pigment color filters 508 (red, green and blue) are each formed on each picture element. Then, both substrates, after they are spin coated with Optomer AL 1254 made by Japan Synthetic Rubber Co., are baked for one hour at 150° C., and parallel alignment films 504 and 507 are formed. The two substrates thus obtained are placed with a cavity of 5 $\mu$m and their borders are joined and fixed, making a hollow panel with a five inch diagonal. In addition, in order to parallel orient the liquid crystal randomly near the substrate surfaces, rubbing treatment is not performed.

Then, the liquid crystal mixed material, consisting of the same liquid crystal, dichroic dye, chiral component and polymer precursor as in the first embodiment, is vacuum enclosed in the hollow panels. The liquid crystal mixed material enclosed in the panel, just as in the first embodiment, is inspected with a polarization microscope to see that it is parallel oriented near the substrate surfaces, and in a state of being twisted approximately 90° between substrates 501 and 510, and also it is inspected to see that the randomly oriented liquid crystal orientation domains are even multidomains at the level of approximately 1–3 $\mu$m.

After that, the polyrmer is separated from within the liquid crystal mixed material. by irradiating into the panel, ultraviolet rays at an illumination intensity of 5 mW/$Cm^2$ (wavelength 350 nm) for 7 minutes, and the liquid crystal display device of the present embodiment shown in FIG. 5 is completed. Liquid crystal 506 is inspected with a polarization microscope to see that it shows the orientation state from before ultraviolet radiation, or in other words that it is randomly oriented parallel near the substrate surfaces, that it is twisted approximately 90° between substrates 501 and 510, and also that the randomly oriented liquid crystal domains are even multidomains at the level of about 1–3 $\mu$m. Also it is confirmed with a polarization microscope that polymer 505 and liquid crystal 506 are in a mutually oriented structure between the substrates and dispersed.

In the liquid crystal display device obtained in this way, when the voltage is off, a blank display is obtained through the absorption of the dichroic dye, and a color display is obtained by applying voltage on each color picture element Also, when MIM operation is performed at 1/480 duty, reflectance is 32%, and contrast is 12. Also, an eight grade display and a 512 color display are possible. In addition, there is no directivity to the scatter when voltage is applied, making it possible to obtain a liquid crystal display device with superior portability, vision characteristics, and visibility. In addition, when nonglare treatment and nonreflecting treatment are administered to the surface of this liquid crystal display device, background reflection is reduced and visibility is greatly improved.

Also, in the present embodiment, transference electrodes are placed on the MIM substrate, but it is also possible to place reflecting electrodes on the MIM substrate, and to form color filters on them.

Also, the color filter structure used in the present embodiment need not be limited to red, green and blue; any structure capable of reproducing natural colors may be used in the same way. In addition, it is also possible to place color filters on the upper substrate.
(Comparative Example 1)

Figure 6:
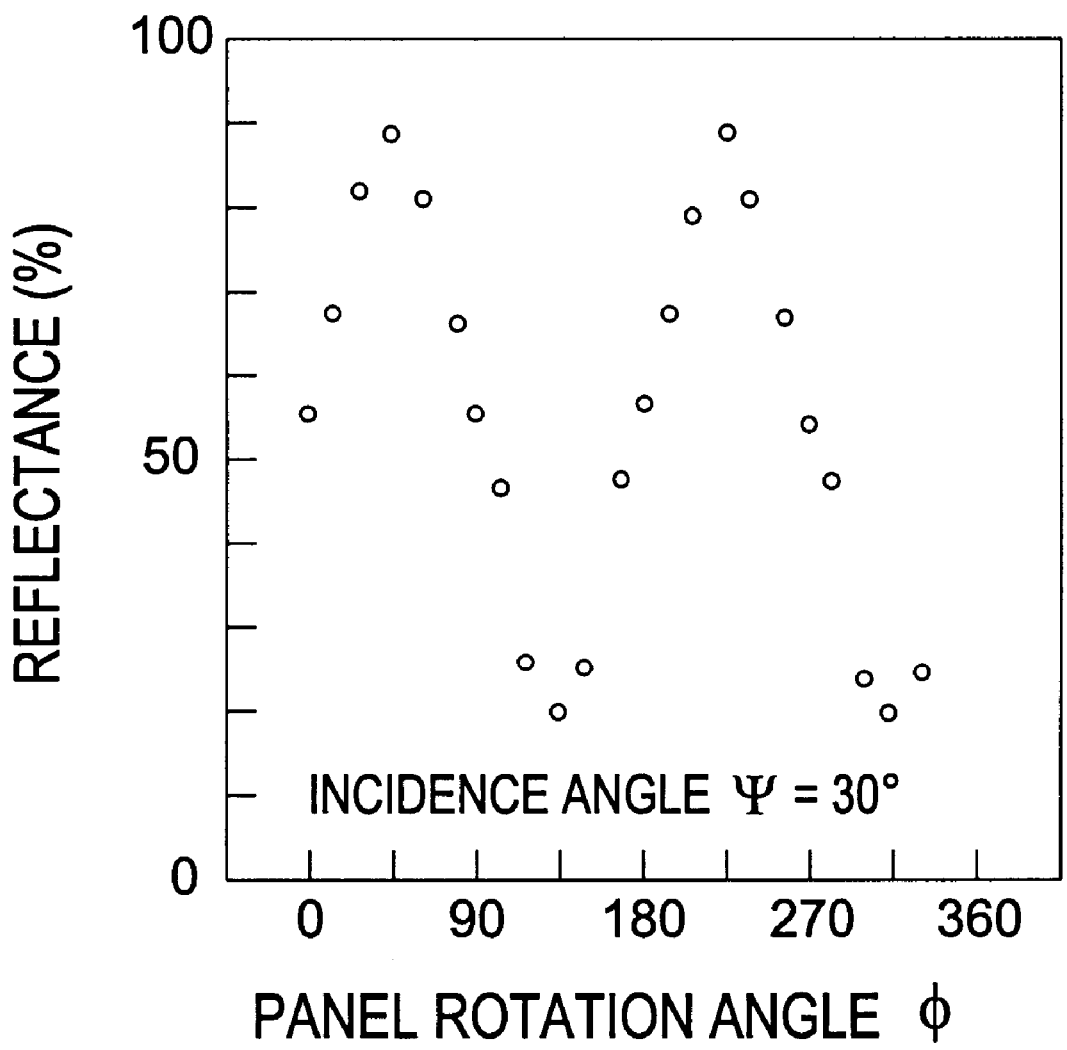
FIG. 6 is a chart showing the scatter directivity of the liquid crystal display device of comparative example 1.

Below will be shown, as a comparative example, a liquid crystal display device with a structure having a twist orientation of 90°, which is not multidomained. Specifically, an alignment membrane is used wherein the polyimide film has undergone one-direction rubbing treatment, and the hollow panel is constructed so that rubbing direction on the upper and lower substrates is 90°. The materials used are the same as in the first embodiment. Then, the liquid crystal mixed material shown in the first embodiment is enclosed, and the polymer is separated from within the liquid crystal by irradiating ultraviolet rays at an illumination intensity of 5 mW/$Cm^2$ (wavelength 350 nm) for seven minutes, and the liquid crystal display device is completed. The result of scatter directivity measurement in the same way as the first embodiment is shown in FIG. 6. Reflectance varies widely depending on the direction of incidence of the light, and strong scatter directivity is displayed.

This concludes the description of the embodiments of the present invention, but the present invention is not limited to the above embodiments.

For example, in the first through third embodiments, a dichroic dye is added to the liquid crystal, but it is not necessary to add the dichroic dye. If the dichroic dye is not added, the black level increases slightly when voltage is not applied, but the absorption of the dichroic dye is eliminated when no voltage is applied, so the maximum reflectance increases and brightness improves. Also, when low-reflectance, reflecting electrodes are used, or when a light absorption layer is placed on the reflecting electrodes, there is no particular necessity to add a dichroic dye.

Also, in the above embodiments 1–3, structures are shown with twist angles of 90°, but they are not limited to this. It is preferable that the twist angle be 360° or less, and it is particularly preferable that it be between 30–180°. When the twist angle is close to 0°, the twist orientation is not stable, and when it exceeds 360°, the operating voltage is high, and operation is impossible with the usual nonlinear elements.

Also, the chiral component that determines the twist angle can be added in appropriate amounts corresponding to the set d/p (cell thickness/liquid crystal torsion pitch). For the chiral component, it is preferable that the material used in normal TN and STN be used in the same way.

It is desired that the oriented domains made by the random parallel orientation of the liquid crystal near the substrate surface be formed with evenness when voltage is not applied and from scattering when voltage is applied, with a uniform size of 0.4–10 μm. If it is under 0.4 μm, scatter is weak, and at over 10 μm, each orientation domain becomes identified. Also, at such a size as mentioned above, to form even multidomains, it is preferable that the method be used of heating and making isotropic the liquid crystal mixed material and then quenching it.

In the above embodiments 1–3, for the alignment membrane used in parallel orientation treatment, a polyimide film was used, but in addition, a polyamide membrane, a SiO oblique evaporation membrane, or polyvinyl alcohol may be used effectively.

As the materials used in the substrates, soda glass, quartz, non-alkali glass, silicon monocrystal, sapphire substrate, thermosetting polymer, thermoplastic polymer, or the like may be suitably used. The polymer material used in the substrates is not particularly limited as long as it does not have a negative effect on the liquid crystal and polymer contained between the substrates, and PET, polyethyl sulfone, epoxy hardening resin, phenoxy resin, polyallyl ether or the like may be suitably used.

The reflective electrodes are Cr in the first and second embodiment and Al—Mg in the third embodiment, but a metal such as Al, Cr, Mg, Ag, Au, Pt or the like, or alloys of these may be effectively used. In particular, Cr or an Al—Mg alloy are preferable from the standpoint of stability and reflectance, and in the case of the Al-Mg alloy, it is desirable that Mg be added in the amount of 0.1 to 100 by weight.

For the liquid crystal, what is normally used in liquid crystal display devices may be effectively used, but in order to improve the degree of scattering, it is desirable that the multiple refractivity anisotropy An of the liquid crystal is equal to or greater than 0.15. Also, in order to drive a non-linear device, it is desirable that the relative resistivity values of the liquid crystal alone be equal to or greater than $1.0 \times 10^9$ Ω·cm, and more preferably, equal to or greater than $1.0 \times 10^{10}$ Ω·cm in order to increase the retention rate and improve the display quality.

As the dichroic dye, it is preferable to use azo, anthraquinone, naphthoquinone, perylene, quinophthalone, azomethyn or the like that are normally used in the GH (guest-host) display format. of these, in terms of light resistance, it is particularly preferable to use anthraquinone alone or a mixture of this with another dichroic dye, as necessary. These dichroic dyes may be mixed depending on the color needed.

As the polymer precursors, any material can be used, as long as it exhibits refractivity anisotropy after polymerization and orientation disperses with the liquid crystal, but from the standpoint of simplicity in the liquid crystal display device manufacture, it is desirable to use an ultraviolet cured type monomer. For the ultraviolet cured type monomer, a monofunctional methacrylate, bifunctional methacrylate or multifunctional methacrylate are preferably used. To improve the degree of scattering, it is desirable to include at least one benzene ring in the polymer structure of these monomers. In particular, materials containing biphenyl, terphenyl or quarterphenyl lattice are desirable. These monomers may also contain a chiral component. Also, it is possible to irradiate these monomers with ultraviolet rays and polymerize them either alone or after mixing with other monomers.

Also, in above embodiments 2 and 3, MIM elements were used as the two terminal nonlinear elements, but besides MIM elements, lateral type MIM elements, back-to-back type MIM elements, MSI elements, diode ring elements, varistor elements and the like may be used. Also, three terminal nonlinear elements may of course be used, and for three terminal nonlinear elements, polysilicone TFT elements, amorphous silicone TFT elements, and Cd-Se TFT elements may be used.

Possible Industrial Applications

As explained above, through the present invention it is possible, in an polymer dispersion type liquid crystal display device that is bright and free from double images and does not need a polarization plate, to solve the problems of operation voltage and visibility impairment due to scatter directivity, which existed in the prior art, through a new structure involving multidomaining the liquid crystal and placing it in a state of twist orientation.

In particular, because the operating voltage of the liquid crystal display device of the present invention is reduced to the TN mode level, it is possible to sufficiently operate the MIM elements and TFT elements and greatly improve brightness and contrast. Through this, it is possible, in the case where it is made as a reflecting type color liquid crystal display device, to increase the number of display colors and visibility. Also, high voltage resistant drivers become unnecessary, making possible reductions in electric power consumption and cost.

In addition, in the liquid crystal display device of the present invention, brightness, vision characteristics, and visibility are improved by controlling scatter directivity.

As a result, the present invention may be used as a liquid crystal display device suitable for portable applications where many various environments may be assumed. Also, the present invention is of active matrix operation, and may be used as a reflecting type large capacity display with low electric power consumption and superior display quality.

What is claimed is:

1. A liquid crystal display device comprising:
liquid crystal molecules, and
polymers with refraction index anisotropy,
wherein said liquid crystal molecules and said polymers are mutually oriented and dispersed between two substrates whose surfaces have an alignment films without undergoing rubbing treatment and on each of which are formed electrodes, and wherein said liquid crystal molecules are randomly oriented near said substrate surfaces roughly parallel to said substrate surfaces, and are twist oriented between said substrates.

2. The liquid crystal display device of claim 1, wherein said liquid crystal is multidomained evenly within a parallel face to said substrate surfaces, wherein within each domain the alignment direction of said liquid crystal is aligned, wherein each said domain exists in a random direction within a face parallel to said substrate surfaces, and wherein within each said domain said liquid crystal is twist oriented between said substrates.

3. The liquid crystal display device of claim 2, wherein the size of each said domain is between 0.4 and 10 μm.

4. The liquid crystal display device of claim 1, wherein the twist angle of said liquid crystal is 360° or less.

5. The liquid crystal display device of claim 4, wherein the twist angle of said liquid crystal is between 30° and 180°.

6. The liquid crystal display device of claim 1, wherein said liquid crystal contains a chiral component.

7. The liquid crystal display device of claim 1, wherein said liquid crystal contains dichroic dye.

8. The liquid crystal display device of claim 1, wherein one of said electrodes is formed of a reflective material.

9. A method for manufacturing the liquid crystal display device of claim 1 comprising:

forming each of a first and a second electrode on each of a first and a second substrate, forming alignment films on the surfaces of each of said first and said second substrates, forming a hollow panel from said first substrate and said second substrate without subjecting said first and second substrate surfaces to rubbing treatment, placing between said first and second substrates in said hollow panel a liquid crystal mixed material of a liquid crystal composite and a polymer or polymer precursor, and separating said polymer from within said liquid crystal mixed material and separating the polymer from the liquid crystal.

10. The method for manufacturing a liquid crystal display device of claim 8 which further comprises heat treating said liquid crystal mixed material past the temperature at which it shows isotropy, after arranging the liquid crystal mixed material of the polymer or polymer precursor and the liquid crystal composite between said first and second substrates of said hollow panel before separating the polymer from said liquid crystal mixed material.

11. The method for manufacturing a liquid crystal display device of claim 10, which also has a process for quenching said liquid crystal mixed material after heat treating it past the temperature at which it shows isotropy.

12. The method for manufacturing a liquid crystal display device of claim 11, which also is a process for using an ultraviolet cured monomer for said polymer precursor, and separating out the polymer from said liquid crystal mixed material and causing general separation of said liquid crystal and polymer by irradiating said liquid crystal mixed material with ultraviolet rays and polymerizing said monomer.

* * * * *